(12) United States Patent
Mottier

(10) Patent No.: US 7,327,668 B2
(45) Date of Patent: Feb. 5, 2008

(54) MULTI-USER DETECTION IN AN MC-CDMA TELECOMMUNICATION SYSTEM

(75) Inventor: David Mottier, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1101 days.

(21) Appl. No.: 10/192,678

(22) Filed: Jul. 11, 2002

(65) Prior Publication Data

US 2003/0063557 A1 Apr. 3, 2003

(30) Foreign Application Priority Data

Jul. 13, 2001 (EP) ................................ 01401882

(51) Int. Cl.
*H04J 11/00* (2006.01)
(52) U.S. Cl. ..................................... 370/203
(58) Field of Classification Search ........ 370/203–211, 370/310, 313, 314; 375/130, 140–145
See application file for complete search history.

(56) References Cited

U.S. PATENT DOCUMENTS

| | | | | |
|---|---|---|---|---|
| 5,598,428 | A * | 1/1997 | Sato ........................... | 375/148 |
| 5,905,718 | A * | 5/1999 | Kurokami et al. .......... | 370/328 |
| 6,259,730 | B1 * | 7/2001 | Solondz ..................... | 375/232 |
| 6,563,859 | B1 * | 5/2003 | Oishi et al. ................ | 375/148 |
| 6,721,293 | B1 * | 4/2004 | Komulainen et al. ....... | 370/335 |
| 7,058,115 | B2 | 6/2006 | Castelain | |
| 7,082,174 | B1 * | 7/2006 | Smee et al. ................. | 375/349 |

OTHER PUBLICATIONS

Bogucka Transmission and reception of multicarrier CDMA signals in the 3rd GMC system, Personal wireless communications, 1996, IEEE, pp. 319-322.*
Shinsuke Hara, et al., "Overview of Multicarrier CDMA", IEEE Communication Magazine, pp. 126-133, Dec. 1997.
J.C. Rault, et al., "The Coded Orthogonal Frequency Division Multiplexing (COFDM) Technique, and Its Application to Digital Radio Broadcasting Towards Mobile Receivers", IEEE Global Telecommunications Conference and Exhibition, vol. 1 of 3, Dallas Tx., Nov. 27-30, 1989.
J.F. Helard, et al., "Linear MMSE Detection Technique for MCCDMA", Electronic Letters, vol. 36 No. 7, pp. 665-666, Mar. 30, 2000.
Thomas P. Krauss, et al., "MMSE Equalization for Forward Link in 3G CDMA: Symbol-Level Versus Chip-Level". IEEE 2000, pp. 18-22.

(Continued)

*Primary Examiner*—Dmitry Levitan
(74) *Attorney, Agent, or Firm*—Oblon, Spivak, McClelland, Maier & Neustadt, P.C.

(57) ABSTRACT

The present invention concerns multi-user detection method of symbols transmitted over a downlink of a multi-carrier code division multiple access telecommunication system, the symbols for a user of the system being spread with a signature over a plurality of carriers, the signal received by a user being decomposed into a plurality of frequency components and said frequency components being despread with said signature. Prior to despreading, said frequency components are equalized by multiplying each of said components with a coefficient, said coefficients taking into account an interference level, after despreading, between the symbols for said user and the symbols for the other users of the system.

8 Claims, 6 Drawing Sheets

OTHER PUBLICATIONS

David Mottier, et al., "A Spreading Sequence Allocation Procedure for MC-CDMA Transmission Systems", 2000 IEEE VTC-Fall VTS 52nd Vehicular Technology Conference, Boston, MA, pp. 1270-1275, Sep. 24-28, 2000.

Nathan Yee, et al., "Multi-Carrier CDMA In Indoor Wireless Radio Networks", PIMRC' 93, The Fourth International Symposium on Personal Indoor and Mobile Radio Communications, pp. 109-113, Yokohama, JP, Sep. 8-11, 1993.

* cited by examiner

MULTI-USER DETECTION IN AN MC-CDMA TELECOMMUNICATION SYSTEM

BACKGROUND OF THE INVENTION

1. Field of the Invention

The present invention relates to a multi-user detection method for a receiver in a multi-carrier code division multiple access system. The present invention concerns also an MC-CDMA receiver implementing such a multi-user detection method.

2. Discussion of the Background Art

Multi-Carrier Code Division Multiple Access (MC-CDMA) combines OFDM (Orthogonal Frequency Division Multiplex) modulation and the CDMA multiple access technique. This multiple access technique was proposed for the first time by N. Yee et al. in the article entitled "Multicarrier CDMA in indoor wireless radio networks" which appeared in Proceedings of PIMRC'93, Vol. 1, pages 109-113, 1993. The developments of this technique were reviewed by S. Hara et al. in the article entitled "Overview of Multicarrier CDMA" published in IEEE Communication Magazine, pages 126-133, December 1997.

Unlike the DS-CDMA (Direct Spread Code Division Multiple Access) method, in which the signal of each user is multiplied in the time domain in order to spread its frequency spectrum, the signature here multiplies the signal in the frequency domain, each element of the signature multiplying the signal of a different sub-carrier.

More precisely, FIG. 1 illustrates the structure of an MC-CDMA transmitter for a given user k. We consider here the forward link, i.e. we suppose that the transmitter is located at the base station. Let $d^{(k)}(n)$ be the symbol to be transmitted to user k at time nT, where $d^{(k)}(n)$ belongs to the modulation alphabet. The symbol $d^{(k)}(n)$ is first multiplied at 110 by a spreading sequence or signature of the user, denoted $c^{(k)}(t)$, consisting of N "chips" or signature elements, each "chip" being of duration $T_c$, the total duration of the spreading sequence corresponding to a symbol period T. The results of the multiplication of the symbol $d^{(k)}(n)$ by the different "chips" are converted by the serial to parallel converter 120 into a block of L symbols, where L is in general a multiple of N. Without loss of generality, we assume otherwise specified in the following that L=N and we denote the elements (i.e. the values of the chips) of the sequence for user k: $c_l^{(k)}$, $l=0, \ldots, L-1$. The block of L symbols output from 120 is subjected to an inverse fast Fourier transformation (IFFT) in the module 130. In order to prevent intersymbol interference, a guard interval of length typically greater than the duration of the impulse response of the transmission channel, is added to the MC-CDMA symbol. This is achieved in practice by appending a suffix (denoted Δ) identical to the start of the said symbol. After being serialized in the parallel to serial converter 140, the MC-CDMA symbols are amplified at 150 in order to be transmitted over the downlink user channel. The MC-CDMA method can therefore be analysed into a spreading in the spectral domain (before IFFT) followed by an OFDM modulation.

In practice, the user k transmits his data in the form of frames of symbols $d^{(k)}(n)$, each symbol being spread by a real signature $c^{(k)}(t)$, with a duration equal to the symbol period T, i.e. $c^{(k)}(t) = 0$ if $t \notin [0, T]$ and $c^{(k)}(t) = \sum_{l=0}^{L-1} c_l^{(k)} \delta(t - lT_c)$ if $t \in [0, T]$.

The signal $S_k(t)$ at time t transmitted to a user k can therefore be written, if we omit the suffix:

$$S_k(t) = a_k \cdot \sum_{l=0}^{L-1} c^{(k)}(t) \cdot d^{(k)}(n) \exp(j \cdot 2\pi(lt/L)) \quad (1)$$

where $\alpha_k$ is the amplitude coefficient of the signal transmitted to user k, assumed to be constant over a transmission frame. Hence, the resulting signal transmitted onto a downlink channel can be expressed, if we omit the suffixes:

$$S_k(t) = \sum_{k=0}^{K-1} \sum_{l=0}^{L-1} a_k c^{(k)}(t) \cdot d^{(k)}(n) \exp(j \cdot 2\pi(lt/L)) \quad (2)$$

where K is the number of users.

An MC-CDMA receiver for a given user k has been illustrated schematically in FIG. 2. This receiver is known as single-user detection receiver (or SUD receiver) because the detection takes only into account the symbols transmitted to (or from) the user in question.

After having propagated over the downlink transmission channel, the signal received is demodulated and sampled at the "chip" frequency $1/T_c$. We assume that the channel is disturbed by an AWGN (Additive White Gaussian Noise) N(t) as illustrated by adder 205 in FIG. 2. The samples of the received signal are then supplied to a serial to parallel converter 210 and stripped from the prefix (Δ) before undergoing an FFT in module 220. The signal on a subcarrier l at the output of 220 can be expressed:

$$r_l(n) = h_l(n) \sum_{k=0}^{K-1} a_k c_l^{(k)} d^{(k)}(n) + n_l(n) \quad (3)$$

where $h_l(n)$ represents the response of the channel of the user k to the frequency of the subcarrier l of the MC-CDMA symbol transmitted at time nT and where n, is the noise component on subcarrier l.

The expression (3) may be rewritten, by adopting a matrix formulation:

$$r(n) = H(n)CAd(n) + n(n) \quad (4)$$

where $r(n) = [r_0(n), \ldots, r_{L-1}(n)]^T$, $H(n) = \text{diag}(h_0(n), \ldots, h_{L-1}(n))$ is the L×L di matrix containing the complex channel attenuation coefficients of the downlink propagation channel, $A = \text{diag}(\alpha_0, \ldots, \alpha_{K-1})$ is the K×K diagonal matrix containing the amplitude coefficients of the active users, $d(n) = [d^{(0)}(n), \ldots, d^{(K-1)}(n)]^T$ is the vector of the symbols transmitted to the K users, n(n) is the vector of the L noise components on the OFDM multiplex and, $$C = (c_1 \ldots c_K) = \begin{bmatrix} c_{0,0} & \cdots & c_{0,K-1} \\ \vdots & & \vdots \\ c_{L-1,0} & \cdots & c_{L-1,K-1} \end{bmatrix}$$

is the L×K matrix containing the signatures of the active users.

In MC-CDMA, the presence of the guard interval makes it possible to neglect the intersymbol interference (provided the guard interval is longer than the delay spread of the channel). Hence, for a given subcarrier (hereinafter simply called carrier), the equalization can be performed by a single tap, i.e. by a multiplication by a complex coefficient. In the SUD receiver, the equalization is performed carrier-by-carrier i.e. by applying one of the known equalization methods e.g. ZF (Zero Forcing), MMSE (Minimum Mean Square Error) etc., independently on each carrier.

The equalizing coefficients are denoted $q_l^{(k)}$, $l=0, \ldots, L-1$ for the SUD receiver dedicated to user k. The samples in the frequency domain are multiplied by the equalizing coefficients in $240_0, \ldots, 240_{L-1}$. In case the MMSE criterion is chosen (as shown in FIG. 2), the equalizing coefficients are given by:

$$q_l^{(k)} = \frac{a_k h_l^*}{\sum_{k=0}^{K-1} |h_l|^2 a_k^2 + \sigma^2} \quad (5)$$

where $\sigma^2$ is the variance of the noise components and.* denotes the complex conjugate. In such instance, the equalization is called per carrier MMSE since the MMSE equalization is performed on each carrier separately. After equalization, the frequency components are multiplied by the conjugated signature of the user k in $250_0, \ldots, 250_{L-1}$ (for despreading) before being added in 260. The result is an estimation $\hat{d}_k(n)$ of the transmitted symbol $d_k(n)$. In fact $\hat{d}_k(n)$ is a decision variable which can be used as such (soft detection) or subjected to a hard decision. For the sake of simplicity, we keep hereinafter the same notation in both cases.

Multiuser detection techniques (MUD) are well known in the context of CDMA telecommunication systems. They have the common characteristic of taking account of the interference generated by the other users, also referred to as MAI for Multiple Access Interference. These techniques have been successfully applied to MC-CDMA.

In particular, a multiuser detection or MUD technique for MC-CDMA was presented in the article by J-Y. Beaudais, J. F. Hélard and J. Citerne entitled "A novel linear MMSE detection technique for MC-CDMA" published in Electronics Letters, Vol. 36, N°7, pages 665-666, 30 Mar. 2000. The equalization method proposed no longer operates carrier by carrier but MC-CDMA symbol by MC-CDMA symbol, taking account of all the carriers and all the signatures of the active users. For this reason it is called GMMSE (Global Minimum Mean Square Error) equalization or, equivalently, M-MMSE (Matrix Minimum Mean Square Error) equalization. Its purpose is to minimize the mean square error between the estimated symbols $\hat{d}^{(k)}(n)$ and the transmitted symbols $d^{(k)}(n)$.

An MC-CDMA receiver with GMMSE equalization for a user k has been illustrated in FIG. 3. Its structure differs from that of FIG. 2 in that the equalization is effected by means of a multiplication 330 by a matrix Q(n) of the signals of the different carriers. As shown in the aforementioned article, the matrix Q(n) can be expressed as follows:

$$Q(n)=H^*(n)(H(n)CA^2C^HH^*(n)+\sigma^2 I_L)^{-1} \quad (6)$$

where $.^H$ denotes the transpose conjugate and $I_L$ is the L×L unity matrix.

The matrix Q(n) takes into account the signatures as well as the levels of transmission $\alpha_k$ of the active users, hence the MUD character of the method.

In fact, expression (6) derives from the application of the Wiener filtering theory to expression (4) where r(n) is the observable and d(n) is the vector to be estimated. The Wiener-Hopf formula can indeed be written, if we omit time index n:

$$\hat{d}=(\Gamma_{rr}^{-1}\Gamma_{rd})^H r = AC^H H^*(HCA^2C^H H^* + \sigma^2 I_L)^{-1} r \quad (7)$$

where $\Gamma_{rr}$ and $\Gamma_{rd}$ are respectively the autocovariance matrix of r and the covariance matrix of r and d.

After equalization in 330, the frequency components are despread by multiplication with the signature of the user in $340_0, \ldots, 340_{L-1}$ and subsequent addition in 350. The result of the despreading is then multiplied by $\alpha_k$ by multiplier 360, in conformity with expression (7), so as to give the estimation {circumflex over $\hat{d}^{(k)}(n)$. In summary, the detection based on expression (7) can be regarded as a step of matrix equalization with Q(n) followed by a step of despreading (and scaling).

The GMMSE receiver described above requires to invert an L×L matrix $(H(n)CA^2C^HH^*(n)+\sigma^2 I_L)$ in (6), that is, in practice, to solve a L×L linear system, whatever the number of active users K. In order to remove this constraint, an alternative GMMSE detection method, has been proposed in French patent application FR 01 04050 filed by the Applicant on 22 Mar. 2001 and included hereinafter by reference. The latter method is based, as in DS-CDMA (Direct Spread Code Division Multiple Access), on a matched filtering process prior to symbol equalization. More specifically, the frequency components output from the FFT are first despread with a filter matched both to the characteristics of the transmission channel and the signatures of the users. The symbols output from the matched filter are then equalized. The first step of matched filtering can be regarded as an MRC combining (in the frequency domain), similar to the one performed by a RAKE filter (in the time domain) in a DS-CDMA receiver.

An MC-CDMA receiver based on said alternative GMMSE detection has been illustrated in FIG. 4. The matched filtering prior to equalization is effected by a multiplication with the matrix $M(n)=C^HH^*(n)$ in 425 while the equalization on the symbols is performed in 430 by multiplication by the matrix:

$$Q'(n)=(AC^H|H|^2(n)CA+\sigma^2 I_K)^{-1}A \quad (8)$$

which can also be written:

$$Q'(n)=A(C^H|H|^2(n)CA^2+\sigma^2 I_K)^{-1} \quad (9)$$

where $I_K$ is the K×K unity matrix and $|H|^2=H.H^*$. As shown in FIG. 4, only the output $\hat{d}^{(k)}(n)$ is of interest for user k.

In general, the matrix form (8) is found more convenient because the matrix to be inverted can often be simplified, as explained in the above mentioned patent application.

The alternative GMMSE detection is based on the fact that the matched filter output z(n) contains an exhaustive summary of r(n) i.e. is itself an observable form which d(n) can be estimated by means of a Wiener filtering:

$$\hat{d} = (\Gamma_{zz}^{-1} \Gamma_{zd})^H z = (AC^H |H|^2 CA + \sigma^2 I_K)^{-1} Az \qquad (10)$$

In contrast with equation (6), the detection according to equation (10) requires to invert a K×K matrix ($AC^H|H|^2(n)CA + \sigma^2 I_K$), that is, in practice to solve a K×K linear system. Hence, when the system does not work at full load i.e. when K<L, the calculation is significantly less complex than in conventional GMMSE.

It is important to note that alternative GMMSE is equivalent to conventional GMMSE in terms of results and that they only differ in the way the calculation is made.

Both conventional GMMSE and alternative GMMSE detection methods need to solve a linear system, either L×L or K×K. As mobile stations have drastic computational restrictions due to power consumption constraints, the complexity involved in the latter detection methods may not be tolerable even for a low system load (K) or a low spreading factor (N=L).

In comparison, the per carrier MMSE detection method, as described in connection with FIG. 2, is much simpler since there is no need to solve a linear system. However, in general, per carrier MMSE does not yield good results because it does not take into account the interference due to the other users.

A first object of the present invention is to propose an MC-CDMA detection method of the MUD type and nevertheless of significantly reduced complexity with respect to conventional GMMSE or alternative GMMSE. A further object of the invention is to propose an MC-CDMA receiver which implements such a detection method.

DETAILED DESCRIPTION OF THE INVENTION

The characteristics of the invention will emerge from a reading of the following description given in relation to the accompanying figures, amongst which:

The basic idea underlying the invention is to adapt the carrier-by-carrier equalization in SUD MMSE so that it takes into account the MAI in an efficient way.

Once again, the context of an MC-CDMA receiver with L carriers and K users will be referred to. The notations adopted in the description of the prior art equally apply hereinafter.

Let us first consider the particular case of an MC-CDMA telecommunication system working at full load, i.e. K=L and furthermore let us assume that the amplitude coefficients $\alpha_k$ are identical i.e. $\alpha_k = \alpha$ for k=0, ..., K-1. In such instance, the matrices $H(n)CA^2 C^H H^*(n) + \sigma^2 I_L$ in (6) and $AC^H|H|^2 CA + \sigma^2 I_K$ in (10) become diagonal and the inversion thereof boils down to mere inverting scalar coefficients. Consequently, equations (6) for conventional GMMSE and (10) for alternative GMMSE can both be rewritten as:

$$\hat{d}^{(k)}(n) = \sum_{l=0}^{L-1} \frac{a \cdot h_l^*(n) \cdot c_l^{(k)*}}{|h_l(n)|^2 \sum_{K=0}^{K-1} a^2 + \sigma^2} r_l(n) \qquad (11)$$

Thus, for full system load and equal transmission power, the MMSE SUD method and the GMMSE based detection methods lead to the same result. However, in any other case, MMSE SUD is not optimal since, in the latter, the off diagonal terms of Q(n) are neglected.

In general, if K<L, the GMMSE detection method requires a matrix inversion. However, the calculation can be greatly simplified by approximating the matrix $H(n)CA^2 C^H H^*(n)$ in (6) to its diagonal elements, that is:

$$\hat{d}^{(k)}(n) = \sum_{l=0}^{L-1} \frac{a_k \cdot h_l^*(n) \cdot c_l^{(k)*}}{|h_l(n)|^2 \sum_{K=0}^{K-1} a_{k'}^2 + \sigma^2} r_l(n) \qquad (12)$$

which can be rewritten:

$$\hat{d}^{(k)}(n) = \sum_{l=0}^{L-1} \frac{a_k \cdot h_l^*(n) \cdot c_l^{(k)*}}{|h_l(n)|^2 (a_k^2 + I_c^{(k)}) + \sigma^2} r_l(n) \qquad (13)$$

where $$I_c^{(k)} = \sum_{k'=0, k' \neq k}^{K-1} a_{k'}^2$$

represents a chip-level interference due to the presence of active users other than the user k of interest.

Figure 1:
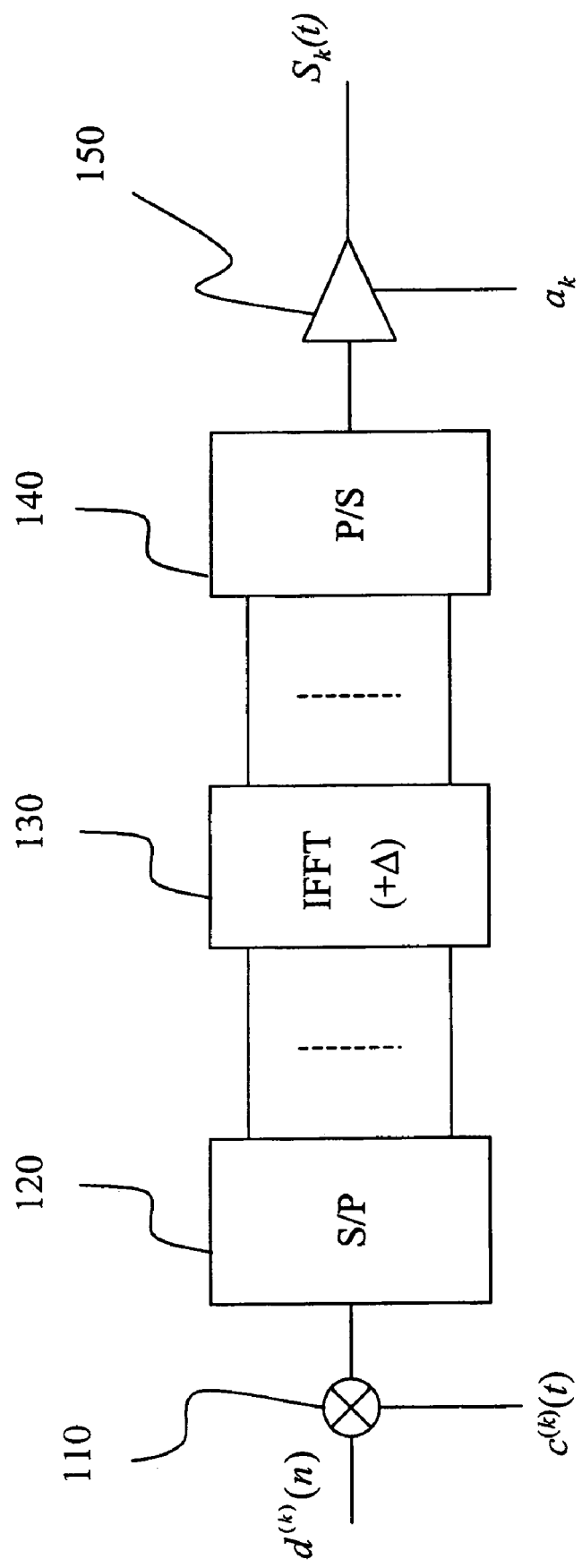
FIG. 1 depicts schematically the structure of an MC-CDMA transmitter known from the state of the art.
Figure 2:
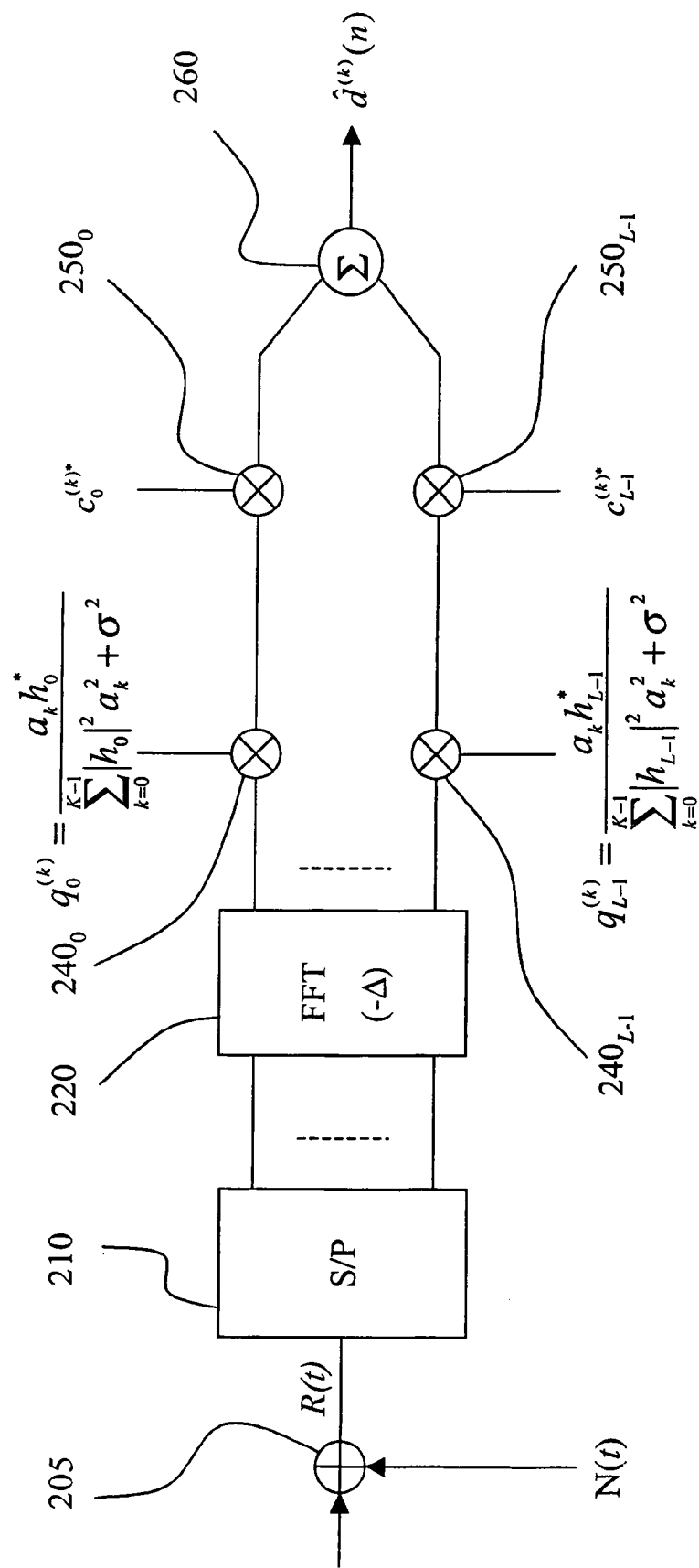
FIG. 2 depicts schematically the structure of an MC-CDMA receiver using a SUD MMSE detection known from the state of the art.
Figure 3:
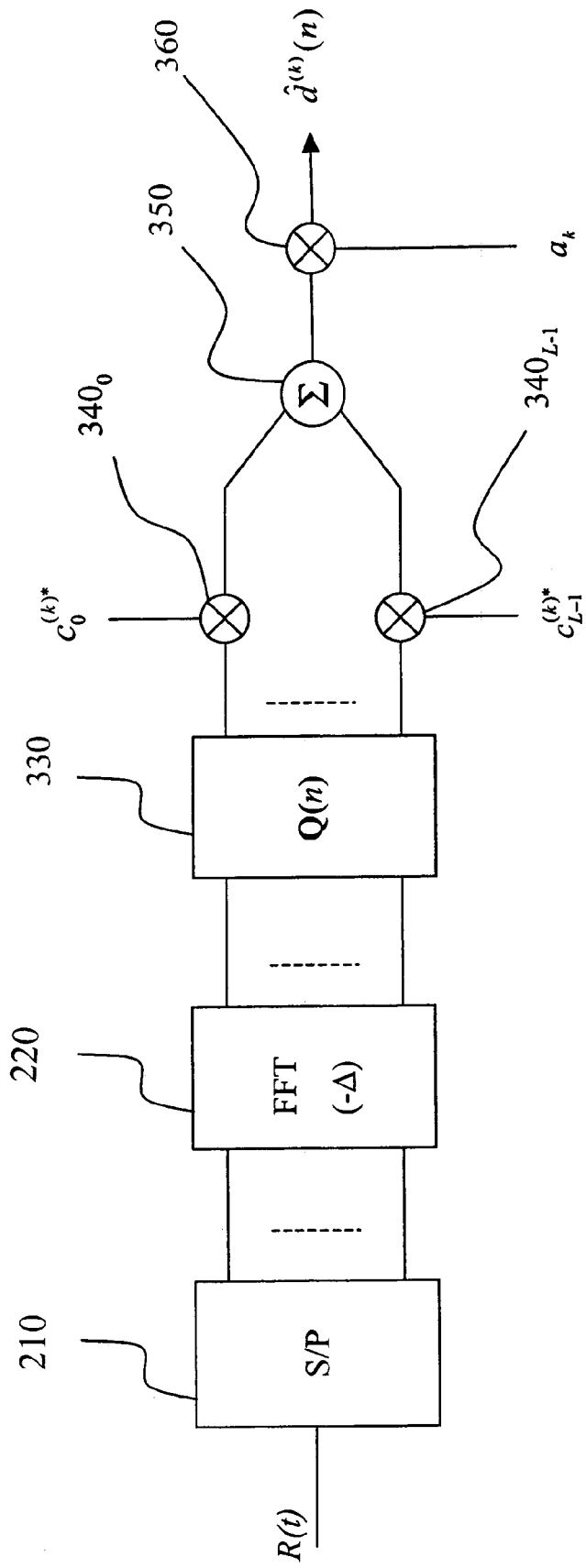
FIG. 3 depicts schematically the structure of an MC-CDMA receiver using a GMMSE detection known from the state of the art.
Figure 4:
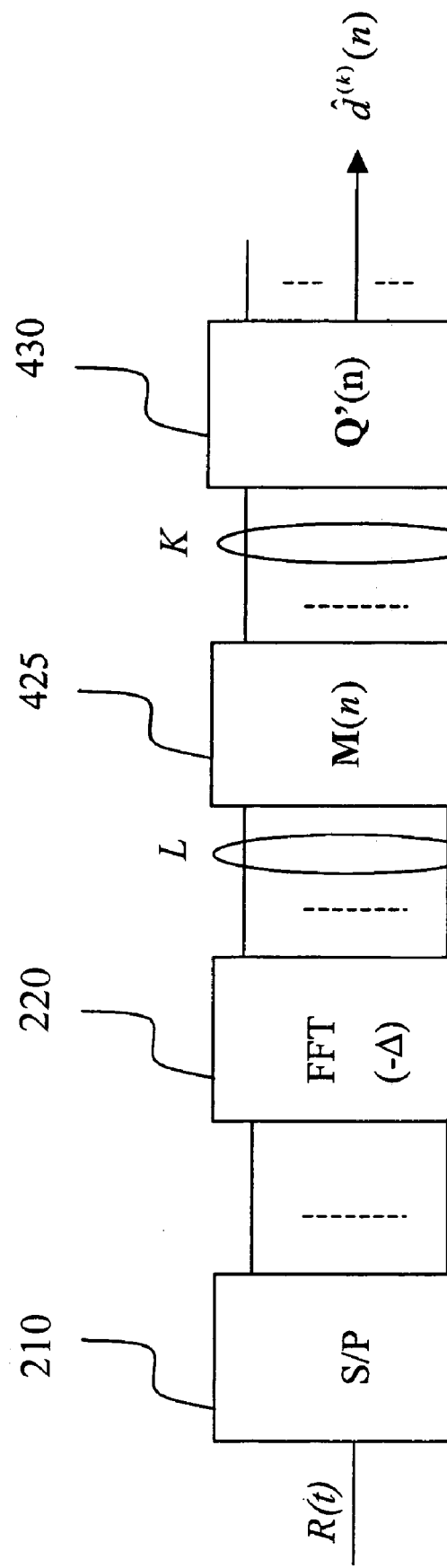
FIG. 4 depicts schematically the structure of an MC-CDMA receiver using in the alternative GMMSE detection disclosed in French patent application FR0104050.

The purpose of the invention is to improve the carrier-by-carrier MMSE detection (13) for frequency correlated channels, by more precisely evaluating MAI at the symbol level. With this aim in view, let us consider again the GMMSE receiver of FIG. 3 and let us assume that no equalization is performed. The power of the estimate can be expressed:

$$E\left[|\hat{d}^{(k)}(n)|^2\right]_{no\ equ.} = E\left[\left|\sum_{l=0}^{L-1} c_l^{(k)} r_l(n)\right|^2\right] \qquad (14)$$

and by replacing (3) in (14):

$$E\left[|\hat{d}^{(k)}(n)|^2\right]_{no\ equ} = a_k^2 \sum_{l=0}^{L-1} \sum_{l'=0}^{L-1} c_l^{(k)} c_{l'}^{(k)*} E[h_l(n) h_{l'}^*(n)] + \qquad (15)$$

-continued $$\frac{\sigma^2}{L} + \sum_{k'=0, k' \neq k}^{L-1} a_{k'}^2 \sum_{l=0}^{L-1} \sum_{l'=0}^{L-1} w_l^{(k,k')} w_{l'}^{(k,k)*}$$

$$E[h_l(n) h_{l'}^*(n)]$$

where we have assumed that the signatures are normalized i.e. $|c_l^{(k)}|^2 = 1/N = 1/L$ and where $w_l^{(k,k')} = c_l^{(k)} c_l^{(k')}$ is the product between the elements (chips) of the respective signatures of user k and user k' on carrier l. The right hand part of equation (15) comprises three terms. The first one corresponds to the desired signal of the user k in question, the second one is due to the AWGN noise while the third one represents the contribution of the other users k'≠k, hereinafter referred to as symbol-level interference and denoted $I_s^{(k)}$.

For frequency non-correlated fading channels, $E[h_l(n)h_{l'}^*(n)]=0$ for l≠l' and therefore (15) becomes:

$$E\left[\left|\hat{d}^{(k)}(n)\right|^2\right]_{no\ equ} = a_k^2 \sum_{l=0}^{L-1} |c_l^{(k)}|^2 E(|h_l(n)|^2) + \qquad (16)$$

$$\frac{\sigma^2}{L} + \sum_{k'=0, k' \neq k}^{K-1} a_{k'}^2 \sum_{l=0}^{L-1} |w_l^{(k,k')}|^2 E[|h_l(n)|^2]$$

If the spreading sequences are normalized, $|w_l^{(k,k')}| = 1/N = 1/L$ and the transmission channel is not lossy i.e.

$$\sum_{l=0}^{L-1} |h_l(n)|^2 = 1,$$

equation (16) becomes:

$$E\left[\left|\hat{d}^{(k)}(n)\right|^2\right]_{no\ equ.} = a_k^2 + \sigma^2/L + \frac{1}{L} \sum_{k'=0, k' \neq k}^{K-1} a_{k'}^2 \qquad (17)$$

where the last term representing the symbol-level interference is equal to the chip-level interference divided by the usual interference reduction factor N (here N=L).

According to the invention, it is proposed to replace in (13) the estimation of the interference at the chip level by an estimation at the symbol level, that is:

$$\hat{d}^{(k)}(n) = \sum_{l=0}^{L-1} \frac{a_k \cdot h_l^*(n) \cdot c_l^{(k)*}}{|h_l(n)|^2 (a_k^2 + L \cdot I_s^{(k)}) + \sigma^2} r_l(n) \qquad (18)$$

Figure 5:
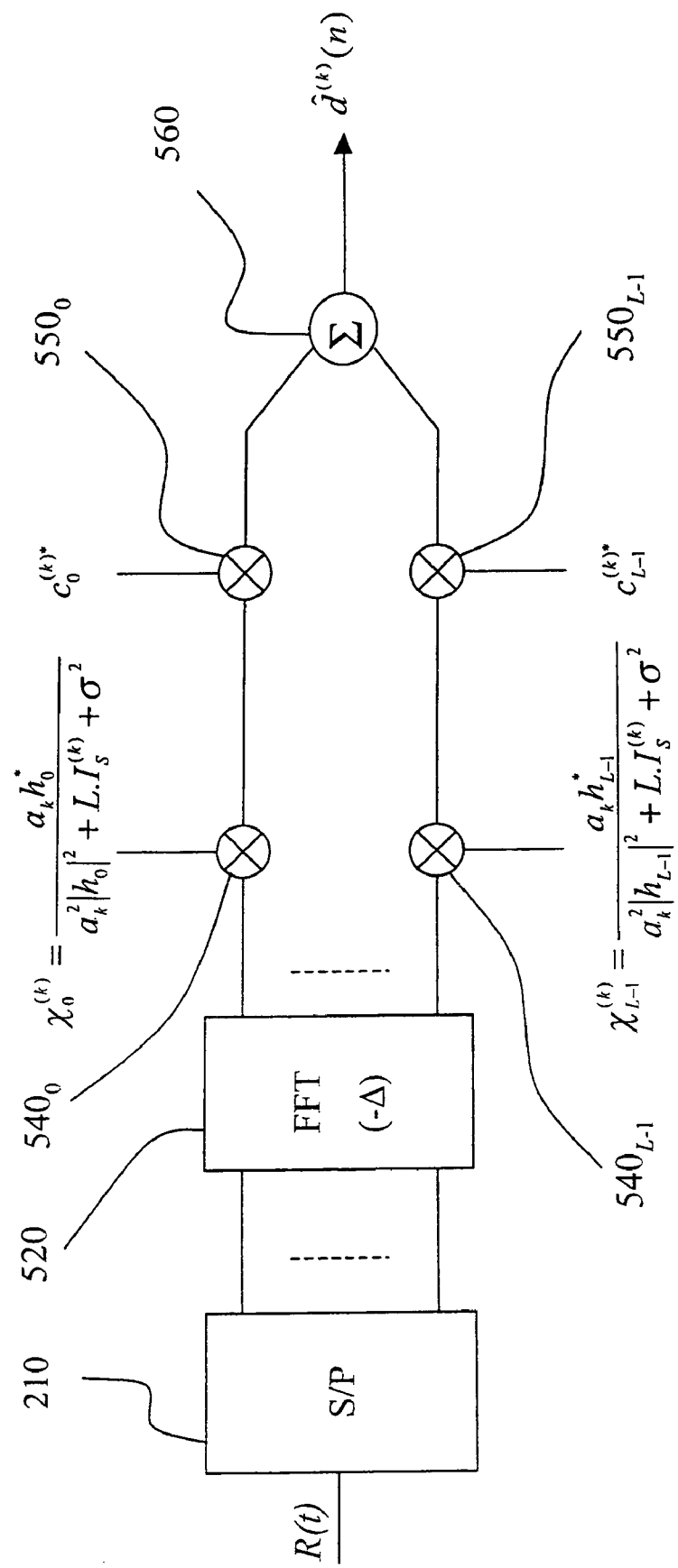
FIG. 5 depicts schematically the structure of an MC-CDMA receiver according to an embodiment of the invention.

FIG. 5 illustrates an MC-CDMA receiver according to an embodiment of the invention. After the FFT 520, the frequency components are equalized according to (18) by multiplying them respectively with the coefficients $\chi_l^{(k)}$ in $540_0, \ldots, 540_{L-1}$ where $$\chi_l^{(k)} = \frac{a_k h_l^*}{a_k^2 |h_l|^2 + L \cdot I_s^{(k)} + \sigma^2}.$$

After equalization, the frequency components are despread as usual by multiplication with the conjugate of the user signature in $550_0, \ldots, 550_{L-1}$ and addition in 560 to output the symbol estimate $\hat{d}^{(k)}(n)$.

More generally, if N<L that is if the length of the signatures is lower than the number of carriers, the symbols $d^{(k)}(n)$ are spread over a subset S(n) of carriers of an MC-CDMA symbol (the subset depends upon n because it shifts at each symbol with respect to 0, . . . , L-1) and equations (18) and (19) become:

$$d^{(k)}(n) = \sum_{l \in S(n)} \frac{a_k \cdot h_l^*(n) \cdot c_l^{(k)*}}{|h_l(n)|^2 (a_k^2 + N \cdot I_s^{(k)}) + \sigma^2} \cdot r_l(n) \text{ where} \qquad (20)$$

$$I_s^{(k)} = \sum_{k'=0, k' \neq k}^{K-1} a_{k'}^2 \sum_{l \in S(n)} \sum_{l' \in S(n)} w_l^{(k,k')} w_{l'}^{(k,k')*} E[h_l(n) h_{l'}^*(n)] \qquad (21)$$

As already noticed, for frequency non-correlated fading channels, $I_s^{(k)} = I_c^{(k)}/L$ (and more generally $I_s^{(k)} = I_c^{(k)}/N$) holds. Hence, in such instance, the estimation according to (18) (and more generally (19)) is equivalent to the estimation according to (13). For frequency correlated channels, however, $I_s^{(k)} = I_c^{(k)}/L$ (and more generally $I_s^{(k)} = I_c^{(k)}/N$) no longer applies and the estimation of MAI at the symbol level leads to better results in terms of BER. This stems from the fact that correlation between the channel attenuation coefficients $h_l(n)$ directly affects the multiple access interference. In particular, it has been shown in the article entitled "A spreading sequence allocation procedure for MC-CDMA transmission systems" by D. Mottier and D. Castelain, published in Proc. of VTC'00 Fall, Vol. 3, pp 1270-1275, that the correlation properties of the channel attenuation coefficients increase or decrease MAI, depending upon the subset of signatures of the active users. Since (18) takes into account the true interference level, the accuracy of the estimation is improved, and this without unduly burdening the computation resources of the mobile (equations (18),(20) and (11) exhibit the same level of complexity). Noteworthy, the detection based on (18) or (20) belongs to the MUD type because the evaluation of the interference at the symbol level relies on the knowledge of the signatures and power levels of the active users.

In order to illustrate this improvement let us first consider the example of an MC-CDMA system with 8 carriers and 2 active users. In addition, let us assume that the user of interest has the signature $c^{(0)} = 1/\sqrt{8}(+1,+1,+1,+1,+1,+1,+1,+1)$ and that the interfering user has the signature $c^{(1)} = 1/\sqrt{8}(+1,-1,+1,-1,+1,-1,+1,-1)$.

Suppose now that the channel attenuation coefficients are such that: $(h_0, \ldots, h_7) = (\alpha, \alpha, \beta, \beta, \gamma, \gamma, \delta, \delta)$. The interference at the symbol level is therefore:

$$I_s^{(0)} = a_I^2/8 \cdot (2\alpha + 2\beta + 2\gamma + 2\delta)(\alpha - \alpha + \beta - \beta + \gamma - \gamma + \delta - \delta) = 0 \qquad (22)$$

while the interference estimated at the chip level is $I_c^{(0)} = a_I^2$. Hence, in this instance, the symbol estimation according to (13) overestimates the MAI.

The improvement of the detection over conventional MMSE SUD has been validated by simulation results with a downlink multi-user MC-CDMA synchronous transmission scheme using 64 FFT-based OFDM modulation and Walsh-Hadamard signatures (spreading codes) of length L=64. The signal bandwidth was chosen to be 20 MHz, the channel had a coherence bandwidth of 2.56 MHz and was power normalized, the transmission to the active users occurred at the same power level.

Figure 6:
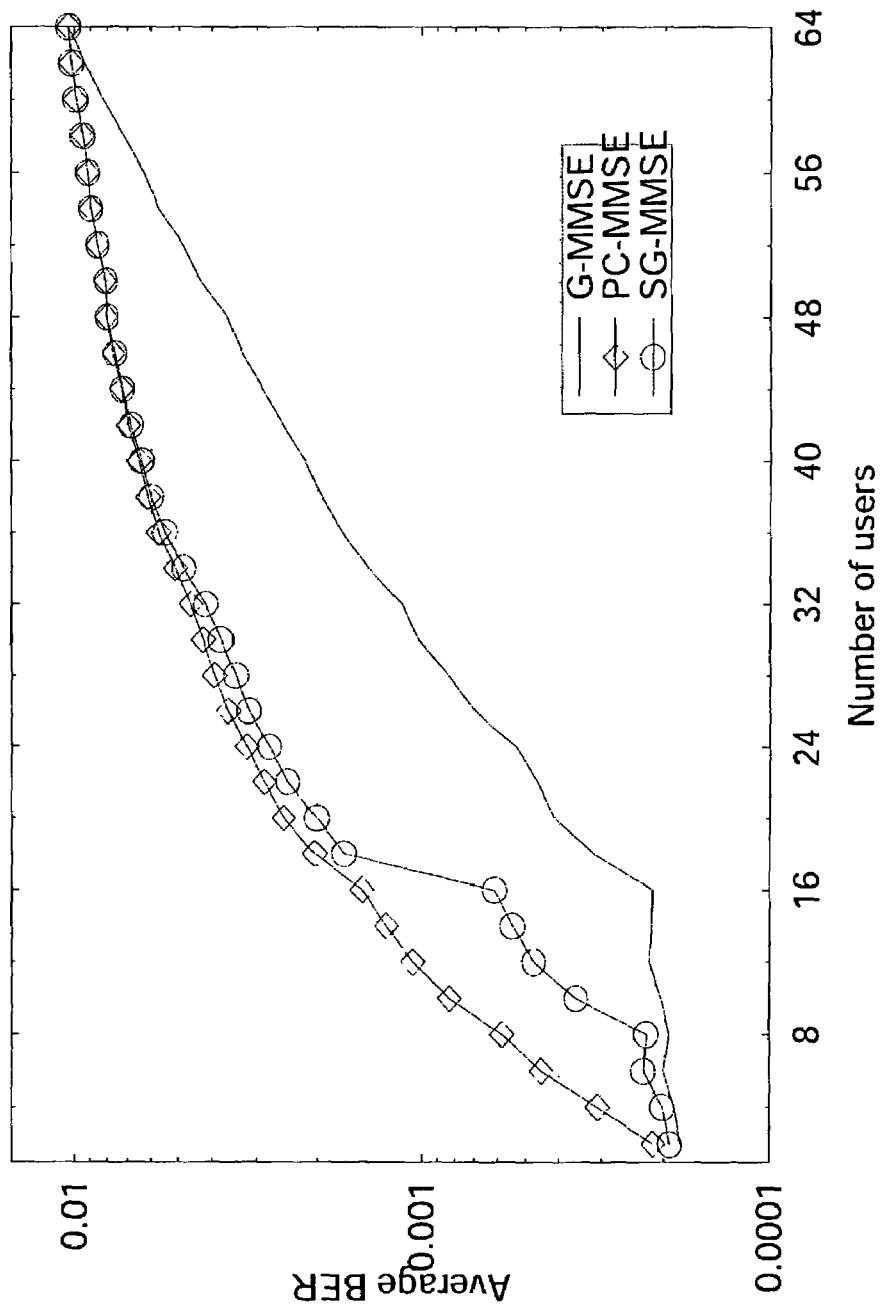
FIG. 6 shows the average bit error rate vs. the number of users for SUD MMSE, conventional GMMSE and the detection method according to the invention.

FIG. 6 shows simulation results in terms of average BER vs. the number of users (K) for MMSE SUD (named in the caption per carrier MMSE or in short PC-MMSE), GMMSE and the detection method of the present invention (named in the caption sub-optimum GMMSE or in short SG-MMSE). It should be noted first that the three detection methods converge at full load. Furthermore, sub-optimum MMSE MUD performs significantly better than MMSE SUD for low system loads and even approaches GMMSE BER level for loads below 8 users.

Although the multi-user detection device for an MC-CDMA receiver according to the invention has been essentially described in terms of functional modules e.g. filters or multipliers, it goes without saying that all or part of this device can be implemented by means of a single processor either dedicated for fulfilling all the functions depicted or in the form of a plurality of processor either dedicated or programmed for each fulfilling one or some of said functions.

The invention claimed is:

1. A multi-user detection method of symbols transmitted over a downlink transmission channel of a multi-carrier code division multiple access telecommunication system, the symbols for a user of the system being spread with a signature over a plurality of carriers, a signal received by a user being decomposed into a plurality of frequency components and said frequency components being despread with said signature, the improvement comprising;
equalizing said frequency components, prior to despreading, by multiplying each of said frequency components by a corresponding coefficient, said coefficient taking into account an interference level, after despreading, between the symbols for said user and symbols for other users of the system, wherein said coefficients are inversely proportional to said interference level affecting said frequency components.

2. The multi-user detection method according to claim 1, wherein said coefficients are proportional to $$\frac{a_k h_l^*}{a_k^2 |h_l|^2 + N \cdot I_s^{(k)} + \sigma^2}$$

where $a_k$ is an amplitude level of symbols transmitted to user k over a transmission channel, $h_l$ is a complex coefficient representing a response of the transmission channel at carrier frequency l, N is a spreading factor of the system, $\sigma^2$ is said noise level and $I_s^{(k)}$ is said interference level.

3. The multi-user detection method according to claim 2, further comprising:
obtaining said interference level from amplitude levels respectively used for transmitting symbols to users other than user k and signatures of these users.

4. The multi-user detection method according to claim 2, further comprising:
obtaining said interference level from correlation of a frequency response of the transmission channel.

5. The multi-user detection method according to claim 4, wherein said interference level is proportional to $$\sum_{k'=0, k' \neq k}^{K-1} a_{k'}^2 \sum_{l \in S(n)} \sum_{l' \in S(n)} w_l^{(k,k')} w_{l'}^{(k,k')*} E[h_l(n) h_{l'}^*(n)]$$

where $a_{k'}$ is an amplitude level used for transmitting symbols to user k'≠k and where $w_l^{(k,k')} = c_l^{(k)} c_l^{(k')}$ is the product between elements of signatures of user k and user k' on carrier l and S(n) is a subset of carriers over which a symbol is spread.

6. A receiver for a user of a multi-carrier code division multiple across telecommunication system and including means for receiving symbols transmitted over a downlink transmission channel, the symbols being spread with a signature over a plurality of carriers, the improvement comprising:
means for carrying out the multi-user detection method according to any one of claims 1 and 2 to 5.

7. The receiver according to claim 6, further comprising:
means for decomposing received signal into a plurality of frequency components and for despreading said components with said signature.

8. The receiver according to claim 7, further comprising:
means for equalizing said frequency components, said equalizing means including means for multiplying each of said components by a coefficient ($\chi_l^{(k)}$), prior to despreading, said coefficient taking into account an interference level, after despreading, between symbols for said user and symbols for other users of the system.

* * * * *